May 2, 1967 H. E. SKETT 3,317,028
ANIMAL FEEDING APPARATUS
Filed April 26, 1965 2 Sheets-Sheet 1

INVENTOR
H. E. Skett
BY
ATTORNEYS

May 2, 1967  H. E. SKETT  3,317,028
ANIMAL FEEDING APPARATUS
Filed April 26, 1965  2 Sheets-Sheet 2

INVENTOR
H. E. Skett
BY
ATTORNEYS

United States Patent Office 3,317,028
Patented May 2, 1967

3,317,028
ANIMAL FEEDING APPARATUS
Herbert Edward Skett, Ellesmere, England, assignor to R. J. Fullwood & Bland Limited, London, England, a British company
Filed Apr. 26, 1965, Ser. No. 450,649
Claims priority, application Great Britain, Apr. 29, 1964, 17,818/64
15 Claims. (Cl. 198—37)

The present invention relates to animal feeding apparatus.

Animals that are housed or tethered separately, for example, cows in a milking parlour, require their foodstuffs to be supplied to their separate feeding points. Mechanical means for supplying foodstuffs from a main storage point to a number of conveniently placed storage hoppers or bins of sufficient capacity to hold enough foodstuffs for several feeds of, say, a pair of animals are known. It frequently arises, however, that different animals are required to be supplied with different quantities of food. This is the normal state of affairs in a milking parlour.

The present invention provides apparatus for supplying solid animal foodstuffs of particulate or granular form from a storage point to a plurality of separate animal feeding points which comprises screw conveyor means extending from the storage point to above each of the feeding points in turn, a plurality of metering chambers (one for each feeding point) communicating with the interior of the screw conveyor means at different points along its length in the region of respective feeding points and extending downwardly therefrom, said metering chambers being so constructed and arranged that foodstuffs can collect therein by gravity-feed from the screw conveyor means, that the metering chambers can be opened to allow such collected foodstuffs to pass freely under gravity to respective feeding points and that the capacity of each metering chamber can be set at any of a number of different values, and switch means responsive to the pressure of the foodstuffs in the conveyor means and arranged to cause the operation of the screw conveyor means to be arrested when all the said metering chambers have been filled.

The pressure-responsive switch means may comprise a sensor member exposed to the interior of the screw conveyor means and so positioned as to be in contact with foodstuffs within the conveyor means at least when all the metering chambers have been filled. The sensor member may be arranged to make or break (as the electrical circuitry requires) contact between electrical contacts in the power supply of an electric motor driving the conveyor means, thereby stopping the electric motor, when the pressure on the sensor member exceeds some pre-assigned value. The sensor member is advantageously situated in the region of the point at which the last metering chamber communicates with the interior of the conveyor means.

According to a modification of the invention, there is provided apparatus for supplying solid animal foodstuffs of particulate or granular form from a storage point to a plurality of separate animal feeding points which comprises screw conveyor means extending from the storage point to above each of the feeding points in turn, return conduit means communicating with the end of the screw conveyor means and arranged to convey excess foodstuffs under gravity back to the storage point, a plurality of metering chambers (one for each feeding point) communicating with the interior of the screw conveyor means at different points along its length in the region of respective feeding points and extending downwardly therefrom, said metering chambers being so constructed and arranged that foodstuffs can collect therein by gravity-feed from the screw conveyor means, that the metering chambers can be opened to allow such collected foodstuffs to pass freely under gravity to respective feeding points, and that the capacity of each metering chamber can be set at any of a number of different values, and switch means responsive to the onset of substantial return of excess conveyed foodstuffs down the return conduit means, the arrangement being such that the switch means causes the operation of the screw conveyor means to be arrested when all the said metering chambers have been filled.

When the apparatus has return conduit means, the switch means may comprise a switch blade or paddle located in the path of falling returning foodstuffs. The switch blade or paddle may be so arranged that, when actuated, it makes or breaks contact (as the electrical circuitry requires) between electrical contacts in the power supply of an electric drive motor for the conveyor means to effect stopping of the electric drive motor.

Once initially charged, the portion of the conveyor means between the storage point and the entrance to the last metering chamber will always have foodstuffs within it. Because the portions of the conveyor means intervening between adjacent metering chambers also, after initial charging, always contain foodstuffs, the relative dimensions of the conveyor means and the metering chambers must be carefully chosen so that premature filling of one or more downstream metering chambers solely by residual foodstuffs in the said intervening portions of the conveyor means does not occur before all upstream metering chambers have been filled. The premature filling would otherwise result in actuation of the switch means by excess foodstuffs in the downstream portion of the conveyor means to arrest the motion of the conveyor means. Thus, on the one hand, when pressure-responsive switch means is used, premature "cut-out" of the drive electric motor would occur as a result of pressure build-up at the pressure-responsive portion of the switch means before all metering chambers in advance of such pressure-responsive portion have been filled, and, on the other hand, when the swich means is responsive to the onset of a substantial rate of return of foodstuffs down return conduit means, premature "cut-out" of the drive motor for the conveyor means would occur by reason of a "pulse" of foodstuffs returning down the return conduit means before all the metering chambers have been filled. As a guide, it can be said that, irrespective of the position of the switch means, the above problem of premature "cut-out" will not arise if the capacity of the interior of the conveyor means between each metering chamber (except the last) and the last metering chamber does not exceed the total capacity of all subsequent metering chambers (including the last metering chamber) when set at minimum desired capacities.

The metering chambers may be manually and separately opened to discharge the metered portions of foodstuffs. Advantageously, however, the apparatus comprises power-operated closure means for closing the lower end of each metering chamber, all said power-operated means being preferably arranged to be energized by a single power source. Advantageously, the arrangement is such that all the closure means cause or allow the metering chambers to open simultaneously, preferably with the arresting of the conveyor means. Where the apparatus is installed in a milking parlour equipped with vacuum milking plant, the said closure means are advantageously pneumatically driven by power derived from the vacuum source of the milking plant. Thus, the arrangement may be such that the metering chambers are closed by placing each closure means into communication with one source of pressure (say, the main vacuum line of the milking plant) and opened to discharge metered foodstuffs by placing the closure means into communication with a source of different pressure (say, the atmosphere). The opening of the lower end of each metering chamber may, in this case, be caused by the weight of the foodstuffs contained in the metering chamber when the closing restraint is removed.

Each metering chamber may conveniently be set at the desired capacity manually before each delivery of foodstuffs, although the setting of the metering chamber does, in fact, in suitable cases, lend itself to remote control and servo-assistance.

There are a number of possible constructions for the variable capacity metering chambers. Thus, in a simple form, the lower end portion of each metering chamber may be formed by a chute of, say, rectangular cross section provided with a plurality of slides at different heights which extend through slots in one or other side wall or both side walls of the chute, any one of which slides, as desired, may be moved to a position in which it extends across the chute to close it and in which it serves as the base of the metering chamber. Instead of there being a slide for each slot, a single slide may be employed which is movable from one slot to another as required, there being provided, if necessary, means for preventing leakage of foodstuffs from the metering chamber through slots situated, for the time being, above the slide. Yet again, instead of slides, a plurality of pairs of cooperating members that are pivotable after the fashion of trap doors may be employed, different pairs being of different heights within the chute and any pair being capable of serving as the base of the metering chamber.

A further form of variable capacity metering chamber is one in which the outlet of the chamber is generally rectangular and closed by a pivotable flap that fits flushly within the outlet, the arrangement being such that the flap can turn upwardly within the confining sides of the chute (to reduce the volume of the space contained above it) or downwardly (to increase the volume of the contained space above it) while still maintaining the outlet from the metering chamber fully closed. Thus, the arrangement may be such that the pivotable flap can adopt any angular position between the vertical and the horizontal, the side of the metering chamber opposite the axis of the pivotable flap then having a surface that is one-quarter of a cylindrical surface. It will be appreciated that, in such case, the pivotal axis of the flap will coincide with the axis of the said cylindrical surface and the capacity variation obtainable will be, at the most, the volume of the quarter cylinder.

Also provided by the present invention is an especially suitable form of variable-capacity metering chamber which can be used with any form of feed system whether employing a conveyor or not. Thus, the present invention provides a variable-capacity metering chamber adapted to receive foodstuffs by gravity feed and, when fully charged, to deliver the foodstuffs to a feeding point likewise by gravity feed, said metering chamber being formed by a tubular conduit open at both ends and which is laterally collapsible over a substantial portion of its length, advantageously, over at least the lower portion of its length and, preferably, over substantially the whole of its length, so as to permit construction at one or more points to effect complete closure at any point or at any one of a number of discrete points along the length of collapsible portion, the portion of the conduit above the constriction (wherever it may be caused), or the portion between any two constrictions, constituting the metering chamber, and there is provided closure means for effecting such constriction prior to each foodstuffs-metering operation.

The invention further provides apparatus for supplying solid animal foodstuffs of particulate or granular form from a storage point to a plurality of separate animal feeding points which comprises conveyor means extending from the storage point to above each of the feeding points in turn, if desired, return conduit means communicating with substantially the end of the conveyor means and arranged to lead excess foodstuffs under gravity back to the storage point, a plurality of metering chambers (one for each feeding point) communicating with the conveyor means at different points along its length in the region of respective feeding points and extending downwardly therefrom, each metering chamber having the form as specified hereinbefore in which the metering chamber is formed by a constrictable tubular conduit, and switch means arranged to arrest the operation of the conveyor means when all the said metering chambers have been filled. Said switch means may be either pressure-responsive or responsive to the onset of substantial return of foodstuffs down the return conduit means, as mentioned hereinbefore. Advantageously, the said conveyor means is a screw conveyor means.

The collapsible portion of the tubular conduit should be substantially non-extensible and, advantageously, such portion has a certain measure of inherent flexural stiffness so that it tends to restore itself to its un-constricted state when the said closure means is inoperative. Preferably the collapsible portion is formed of fabric-reinforced rubber sheeting.

The said closure means is advantageously pneumatically operated, and, where the apparatus is installed in a milking parlour equipped with vacuum milking plant, the closure means is advantageously arranged to be operated by power derived from the main vacuum line of the milking plant. The said closure means is advantageously brought into operation by a valve that, in one position, brings the closure means into communication with a source of relatively low pressure and, in another position, brings the closure means into communication with a source of relatively high pressure, say, the vacuum source of the milking plant and the atmosphere respectively. An especially suitable valve for placing each closure means or all the closure means simultaneously, through a manifold, into communication with two sources of substantially different pressures alternately is an electromagnetically operated valve described in British patent specification No. 795,702 where it is, in fact, serving as a pulsator.

Advantageously, the conveyor means of the apparatus is driven by an electric motor and the circuit arrangement is such that switching-on of the electric drive motor effects simultaneously energisation of the valve or valves associated with the closure means to cause closure of their associated metering chambers, and actuation of the switch means in the conveyor system when all the metering chambers have been filled causes de-energisation of the or each said valve to cause or allow discharge of metered foodstuffs as well as "cut-out" of the electric drive motor of the conveyor means.

Advantageously, the closure means comprises a pair of members situated on opposite sides of the collapsible portion of the conduit and of which at least one is movable towards the other so as to squeeze the conduit between the members to effect closure of the conduit, and the said movable member or members are arranged to be actuated by a reciprocable portion of a pneumatic device, communication with the interior of the pneumatic device being controlled by the electrical switch valve. The pneumatic device may comprise a collapsible bellows, one end of which is fixed and the other end of which is free to move in response to pressure changes within the bellows and is attached to one of the members, the other member being fixed. Instead, the pneumatic device may comprise a piston and cylinder or a diaphragm closing a chamber, the piston or diaphragm being coupled to one of the members, the other member being fixed.

While a number of co-acting pairs of members at set positions along the length of the collapsible portion of each tubular conduit may be used, any one pair of which being capable of effecting closure of the conduit, it is preferred to employ closure means comprising one pair only of such coacting members and to effect movement of the pair of members along the length of the collapsible portion of the conduit as desired between metering operations so as to vary the capacity of the metering chamber. Such movement may conveniently be effected manually and normally some form of scale would be used to indicate the capacity (in, say, pounds of a foodstuff, or each of several different foodstuffs) of the portion of the conduit remaining above the members for each of a number of positions of the members. The said members are preferably rollers. Where the closure means is operated from the main vacuum line of a vacuum milking plant as power source, it will usually be in communication therewith through flexible tubing, and such flexible tubing will not in any way interfere with free raising or lowering of the closure means as a unit along the length of the collapsible portion of the conduit.

The invention also provides a metering chamber having two closure means, at different heights, one of said closure means, preferably the upper, being at a fixed height, the other being movable along the length of the chute. One such closure means, preferably the upper closure means, is advantageously closable by collapsing the bellows and openable by allowing or causing the bellows to return to the extended position, and the other closure means is openable by collapsing the bellows and closable mechanically, for example by a counterweight or resilient means, preferably compression springs. The invention also provides a feeding apparatus comprising a hopper and an open discharge point in its underside, to which is attached the open upper end of such a metering chamber.

One form of animal feeding apparatus, and a variable-capacity metering chamber included therein, each constructed in accordance with the invention, will now be described by way of example in greater detail with reference to the accompanying drawings, in which.

Figure 1:
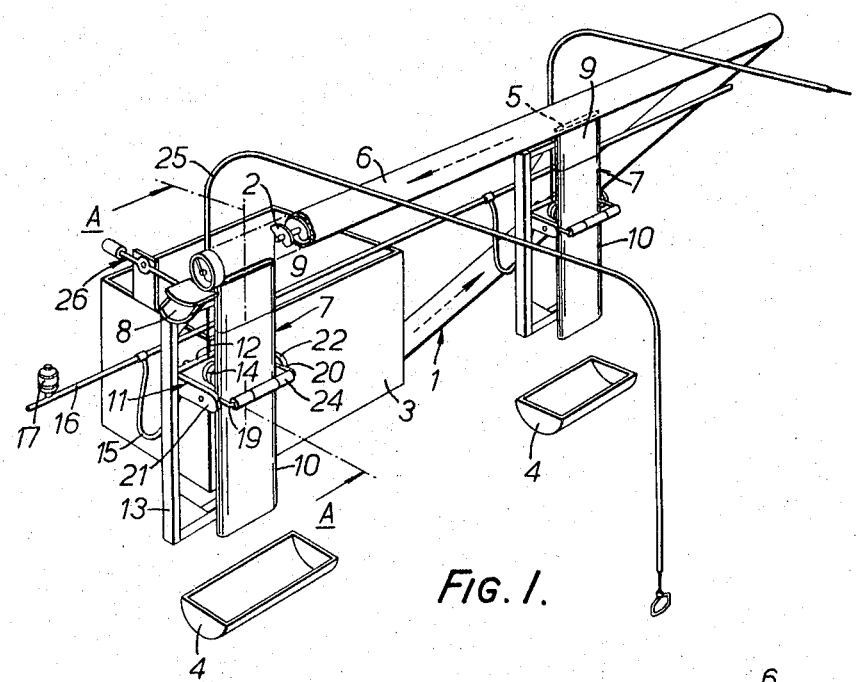
FIG. 1 is a perspective view, partly cut away, of an animal feeding apparatus.
Figure 3:
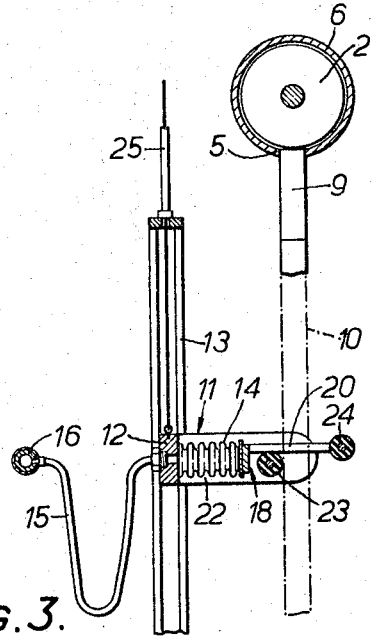
FIG. 3 is a vertical section through AA on FIG. 1.

Referring now to FIGS. 1 and 3, the apparatus is installed in a milking parlour and includes screw conveyor means indicated generally by the reference numeral 1 comprising such number of conveyor screws 2 coupled end to end as is necessary conveniently to convey a particulate foodstuffs, for example, meal flake or cake over the distance from a suitable charging point 3 say a main storage room or bin, to, in turn, positions above feeding troughs 4 in the several animal feeding points in the parlour. The construction of the screw conveyors (also termed "augers") and the manner of their coupling together so as to negotiate corners are standard and so are not described in detail. For clarity, only two feedings points are shown, although normally four such points, at least, would be fed from one store.

At suitably spaced points along the length of the part of the screw conveyor means 1 extending above the animal feeding points are openings 5 formed in the underside of the enclosure 6 of the screw conveyor means through which openings the conveyed foodstuffs may be discharged under gravity. Registering with these openings and joined to the tubular enclosure, are tubular chutes indicated generally by the reference numeral 7 and which provide metering chambers which extend downwardly from the said openings and discharge, when open, into the feeding troughs 4. The screw conveyor means 2 terminates at the entrance to the last tubular chute of the series. Communicating with the end of the screw conveyor means 1 is a return conduit 8 that provides a downwardly sloping passage for free return, under gravity, back to the storage point 3 for conveyed foodstuffs in excess of that needed to fill all the metering chambers. The downwardly-extended tubular chutes are collapsible over all of their lengths except for their upper end portions where short rigid tubes 9 are provided to which the collapsible portions 10 are clamped in overlapping relationship and which are attached to the enclosure 6 of the conveyor screw. The collapsible portions 10 are formed of fabric-reinforced rubber sheeting.

Each chute is provided with closure means indicated generally by the reference numeral 11 which acts to constrict the collapsible portion 10 of the chute, thereby enabling the space contained within the chute above the constriction to be filled with foodstuffs. The position of each closure means along the length of the tubular portion of each chute is adjustable to enable constriction, and hence closure, of the chute to be effected at different heights thereby varying the capacity of the said contained space.

Each closure means comprises a base plate 12 having substantial weight, slidable in fixed vertical guides 13. Extending outwardly from one face of the plate 12 is a collapsible bellows 14, the plate 12 closing the bellows 14 at one end and the bellows being closed also at its other end. Communicating with the interior of the bellows through a nipple registering with a bore in the plate is one end of a flexible tubing 15, the other end of which is placed in communication alternately with the atmosphere and the main vacuum line of a vacuum milking plant (not shown) through a manifold 16 common to all the flexible tubes from the several closure means and, beyond the manifold, an electrically actuated valve 17. This valve has the same construction as the pulsator described by way of example in British specification No. 795,702.

Fixed to the closed end of the bellows 14 remote from the plate 12 and movable with said closed end is a bifurcated member, indicated generally by the reference numeral 18, the branches 19, 20 of which extend generally horizontally away from the bellows in the direction of its length and pass one on either side of the collapsible portion 10 of the associated tubular chute. The branches 19, 20 are supported along a part of their lengths in slides (21, 22, slide 21 supporting branch 19 and slide 22 supporting branch 20) rigidly attached to the plate 12.

Joined across between the slides in such manner as not to interfere with free sliding movement of the branches of the bifurcated member is a horizontal roller 23 which just contacts, or is very close to, the side of the collapsible portion 10 of the tubular chute nearest the plate 12.

Joined across between the ends of the branches 19, 20 of the bifurcated member is a horizontal roller 24 that is parallel to the roller 23. The arrangement of the closure means is such that, when the bellows 14 contracts through placing its interior into communication with the main vacuum line of the vacuum milking plant, the bifurcated member 19 is drawn towards the plate 12 and the attendant movement of its associated roller 24 towards the roller 23 results in the compression of the embraced portion of the tubular chute between the two rollers to cause closure of the chute.

A cable 25 is provided for raising the plate 12 of the closure means in its guides 13 so that the rollers 23, 24 act at points further up the length of the collapsible portion 10 of the tubular chute to provide a metering chamber of a smaller volume and means (not shown) are provided for holding the closure means in any desired position. The plate descends under its own weight when the holding means is released.

The screw conveyor means is driven by an electric motor (not shown) and the electric circuitry of the apparatus is such that when the motor is switched-on the switch valve is simultaneously energised to bring the several bellows into communication, through the manifold, with the main vacuum line of the vacuum milking plant thereby effecting closure of the lower ends of all the metering chambers, the capacities of which have been manually preset at the desired values.

The volume of the metering chamber may be maintained at any desired value by the provision of a locking device to which a handle at the end of the cable may be affixed. Conveniently, the handles will slide on a panel and a number of locking positions allow the capacity of the metering chamber to be varied at, say, 1 lb. intervals. Conveniently, the cables from each metering chamber are led to a position so that the capacities of the metering chambers may each be observed and varied from a single position or, in a larger installation, from a small number of such position.

Switch means 26 provided in the return conduit is responsive to the onset of return of foodstuffs in excess of that needed to fill the metering chambers. Said switch means has a switch blade or paddle that is exposed for contact with returning descending foodstuffs by which it is actuated so as to cause the power supply to the electric drive motor of the conveyor means to be cut-off and, hence, the operation of the conveyor means to be arrested. The electric circuitry of the apparatus is also so arranged that when the said switch means arrests the operation of the conveyor means the switch valve is de-energised to allow expansion of the several bellows and discharge of the several metered portions of the foodstuffs contained in their associated metering chambers. The switch blade or paddle is self-restoring when no longer impinged upon by descending foodstuffs but the power supply to the drive motor of the conveyor means is switched on again only when a control switch is manually switched on.

Figure 2:
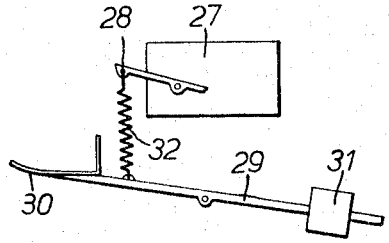
FIG. 2 is a diagrammatic side elevation of a switch means.

Referring now more especially to FIG. 2, the switch means indicated diagrammatically by reference numeral 26 in FIG. 1, comprises, for example, a standard mercury switch 27 (of a type commonly used, for example, as a float switch on liquid installations), actuated by movement of an arm 28 pivotably attached to the casing of the switch. An arm 29, pivotably attached at a point in its medial region has a shovel pan 30 at one end and a counterweight 31 at the other. One end of a spring 32 is attached to the arm 29 at a position between the pivot and shovel pan 30 and at its other end to an end of the arm 28. In operation, when all the metering chambers have been filled, foodstuffs returning along the conveyor overflows into the pan 30 and, when sufficient has entered the pan 30, the weight on the pan side of the pivot is sufficient to overcome the counterweight 31, the arm 28 on the mercury switch 27 is lowered by movement of the spring 32, and the switch is operated to make or break the circuit to the valve 17 (as the case may require) which destroys the vacuum in the manifold 16 and the bellows 14, thus causing the metering chambers to open, allowing food to fall freely under gravity into the several feeding troughs 4. Simultaneously, as stated above, the power supply to the motor of the conveyor means is cut, and the conveyor means ceases to deliver foodstuffs to the metering chambers.

Figure 4:
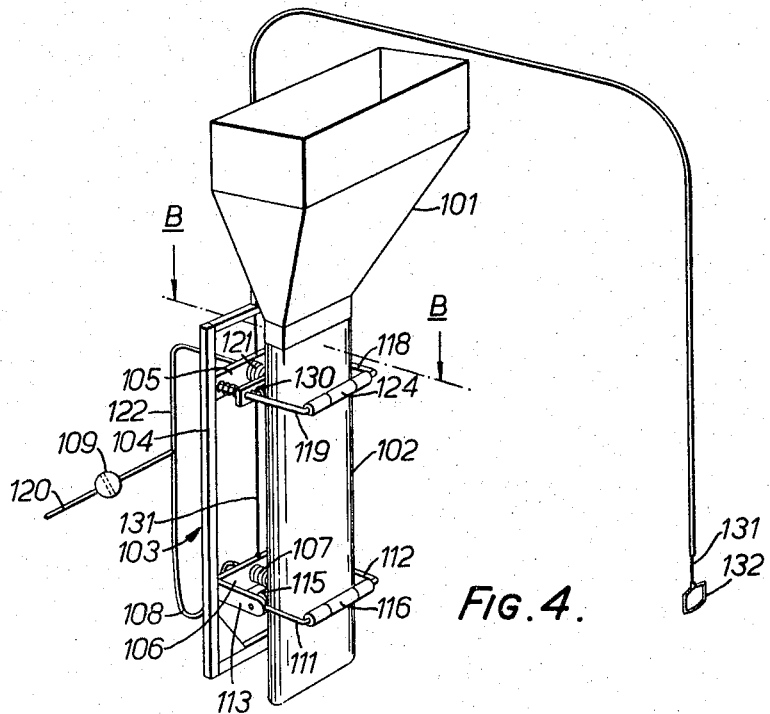
FIG. 4 is a perspective view of a variable capacity metering chamber suitable for use with a feed hopper.
Figure 5:
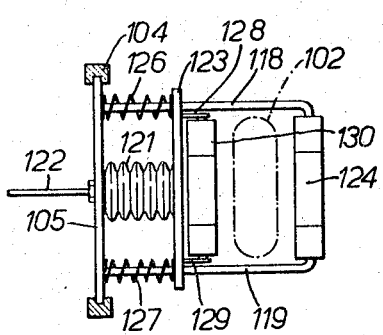
FIG. 5 is a section through BB on FIG. 1.

Referring now to FIGS. 4 and 5 of the drawings, a feed hopper 101 has an open lower end to which is attached to an open ended downwardly extending tubular chute 102, which is collapsible over the whole of its length.

The chute 102 is provided with a closing device, indicated generally by reference numeral 103, which comprises a pair of fixed vertical guides 104 between which is fixedly mounted a base plate 105 and, beneath the plate 104. Extending outwardly from one face of the slidably mounted plate 106 is a collapsible bellows 107, the plate 106 closing the bellows 107 at one end, the other end also being closed. Communicating with the interior of the bellows 107 through a nipple registering with a bore in the plate 106 is one end of flexible tubing 108, the other end of which is connected to a tap 109 which, when open, affords communication with a vacuum line 120.

Fixed to the end of the bellows 107 remote from the plate 106, and movable with the said end is a bifurcated member, the branches, 111 and 112, of which extend generally horizontally from the bellows in the direction of its length and pass one on either side of the tubular chute 102. The branches 111 and 112 are supported along a part of their lengths in slides (slide 113 supporting branch 111 and another slide not shown supporting branch 112) rigidly attached to the plate 106.

Joined across between the slides in such manner as not to interfere with free sliding movement of the branches of the bifurcated member is a horizontal roller 115 which is positioned close to the side of the tubular chute nearest the plate 106.

Joined across between the ends of the branches 112, 113 of the bifurcated member 110 is a horizontal roller 116 parallel to the roller 115. The arrangement is such that, when the bellows 107 contracts through placing its interior into communication with the vacuum line 110, the bifurcated member 110 is drawn toward the plate 106, and the attendant movement of its associated roller 116 toward the roller 115 causes the chute to be compressed between the two rollers to cause closure of the chute.

Extending outwardly from the fixed base plate 105 is a collapsible bellows 121, the plate 105 closing the bellows at one end, the other end also being closed. Communicating with the interior of the bellows 121 through a nipple registering with a hole in the plate 105 is one end of a piece of tubing 122, the other end of which is connected to the same side of the tap 109 as is the flexible tubing 108.

Fixed to the plate 105 are rod-like arms 118, 119, extending horizontally one on each side of the chute 102. Between the ends of the arms 118, 119 remote from the plate 105 is a horizontal roller 124. Fixedly mounted on the end of the bellows 121 remote from the plate 105 is a plate 123, slidably mounted on the arms 118 and 119, the portions of the arms 118 and 119 between the plates 105 and 123 serving also to locate compression springs 126, 127 between the plate 105 and the sliding plate 123. Extending from the side of the sliding plate 123 remote from the bellows 121 are stub arms 128, 129, parallel to arms 118 and 119. Between arms 128 and 129 extends a horizontal roller 130.

The strength and length of the springs 126 and 127 are such that, when the bellows 121 is at atmospheric pressure, the roller 130 is urged toward roller 124, closing the tubular chute 102 between the rollers, and when the bellows 121 is collapsed by the reduced pressure achieved by connexion through the tap 109 to the vacuum line 120, the roller 130 is withdrawn toward plate 105 sufficiently to allow the tubular chute to open.

Tap 109 is provided with an air bleed, such that when in the "on" position the lengths of tubing 108, 122 are connected to the vacuum line 120, and when in the "off" position, to the atmosphere. Attached to the top of the slidably mounted base plate 106 is a cable 131, which terminates in a handle 132. This handle is adapted to be fixed at any one of a number of selected positions, thus enabling the volume delivered by the feeding device to be varied.

In operation, on turning the tap 109 to the "fill" position, the bellows 121 and 107 are contracted, opening the upper closure means, and simultaneously closing the lower closure means, allowing foodstuffs contained in the hopper 101 to enter the portion of tubular chute 102 between them. After the foodstuffs have filled the chute, the tap 109 is returned to the "feed" position, when the upper closure means is closed by the action of the springs 126, 127 urging the roller 130 toward the roller 128, the lower closure means being opened by the movement of the roller 116 away from the roller 115.

I claim:

1. A variable capacity metering chamber adapted to receive foodstuffs by gravity feed and to deliver foodstuffs by gravity feed, said metering chamber comprising a vertical tubular conduit open at both ends and being laterally collapsible over a substantial portion of its length to permit constriction at any point or any one of a number of points along the length of the collapsible portion, and closure means for effecting such constriction said closure means being movable along the length of the collapsible portion of the conduit.

2. A metering chamber as claimed in claim 1, wherein the collapsible portion of the tubular conduit extends over at least the lower portion of its length.

3. A metering chamber as claimed in claim 1, wherein the tubular conduit is collapsible over substantially the whole of its length.

4. A metering chamber as claimed in claim 1, wherein the closure means is arranged to be operated by power derived from the vacuum line of a milking plant.

5. A metering chamber as claimed in claim 1, wherein the closure means is brought into operation by a valve which, in one position, brings the closure means into communication with a source of relatively low pressure and, in another position, brings the closure means into communication with a source of relatively high pressure.

6. A metering chamber as claimed in claim 1, wherein the closure means comprises a pair of members situated on opposite sides of the collapsible portion of the tubular conduit, at least one of said members being movable towards the other so as to squeeze the tubular conduit between the members to effect closure of the conduit, the said movable member or members being arranged to be actuated by a reciprocable portion of a pneumatic device.

7. A metering chamber as claimed in claim 6, wherein the pneumatic device comprises a collapsible bellows, one end of which is fixed and the other end which is free to move in response to pressure changes within the bellows, said other end being attached to the said movable member.

8. A metering chamber as claimed in claim 6, provided with at least two closure means at different heights.

9. A metering chamber as claimed in claim 8, provided with two closure means, one of said closure means being movable along the length of the collapsible portion of the tubular conduit, the other closure means being fixed relative to the length of the conduit.

10. A metering chamber as claimed in claim 9, wherein the pneumatic device is a bellows and wherein one of said closure means is closable by collapsing the bellows, and openable by allowing or causing the bellows to return to the extended position, and the other said closure means is openable by collapsing the bellows and closable mechanically.

11. A metering chamber as claimed in claim 10, wherein the height of the upper closure means is fixed and the said closure means is arranged to be in the closed position when its bellows is extended.

12. A metering chamber as claimed in claim 10, wherein the movable member of the closure means openable by collapsing the bellows is urged toward the other member of the closure means by springs.

13. Apparatus for supplying solid animal foodstuffs in particulate or granular form which comprises a hopper having a discharge point in its underside, such discharge point being attached to the open upper end of a variable capacity metering chamber comprising a vertical tubular conduit open at both ends and being laterally collapsible over a sufficient portion of its length to permit constriction at any point along the length of the collapsible portion and provided with two closure means at different heights along the collapsible portion, the upper of said closure means being fixed relative to the length of the conduit, the lower of said closure means being movable along the length of the collapsible portion of the tubular conduit, each closure means comprising a pair of members situated on opposite sides of the conduit, one of said members being movable toward the other so as to squeeze the tubular conduit between the members to effect closure of the conduit, the said movable member being arranged to be actuated by a reciprocable portion of a pneumatic device.

14. Apparatus as claimed in claim 13, wherein the pneumatic device comprises a collapsible bellows, one end of which is fixed and the other end is free to move in response to pressure changes within the bellows, said other end being attached to the said movable member.

15. Apparatus as claimed in claim 14, wherein one of the closure means is closable by collapsing the bellows, and openable by allowing the bellows to return to the extended position, and the other closure means is openable by collapsing the bellows and closable mechanically.

References Cited by the Examiner

UNITED STATES PATENTS 3,180,318  4/1965  Fisher _____ 119—56

FOREIGN PATENTS 977,206  12/1964  Great Britain.

EVON C. BLUNK, *Primary Examiner.*

A. C. HODGSON, *Assistant Examiner.*